J. LIPS.
KNEADING AND MIXING MACHINE.
APPLICATION FILED DEC. 22, 1908.

971,387.

Patented Sept. 27, 1910.
2 SHEETS—SHEET 1.

Witnesses.
E. M. Morgan
M. E. Rucknal

Inventor.
Jakob Lips,
By B. Luegy
Attorney

J. LIPS.
KNEADING AND MIXING MACHINE.
APPLICATION FILED DEC. 22, 1908.

971,387.

Patented Sept. 27, 1910.
2 SHEETS—SHEET 2.

Witnesses.
E. M. Morgan.
W. E. Ruebush

Inventor.
Jakob Lips,
By ........
Attorney

UNITED STATES PATENT OFFICE.

JAKOB LIPS, OF NIEDER-URDORF, SWITZERLAND.

KNEADING AND MIXING MACHINE.

971,387. Specification of Letters Patent. Patented Sept. 27, 1910.

Application filed December 22, 1908. Serial No. 468,756.

*To all whom it may concern:*

Be it known that I, JAKOB LIPS, a citizen of the Swiss Confederation, residing at Nieder-Urdorf, in Switzerland, have invented certain new and useful Improvements in Kneading and Mixing Machines, of which the following is a specification.

This invention relates to machines for kneading and mixing dough and similar masses.

Objects of the invention are to provide a device for a thorough mixing of a plurality of ingredients in a container and for working the obtained composition into one coherent mass.

The objects are attained by imparting rotary motion to the container of the ingredients and to provide suitably shaped kneading members alternately moving up and down in said container.

Figure 1:
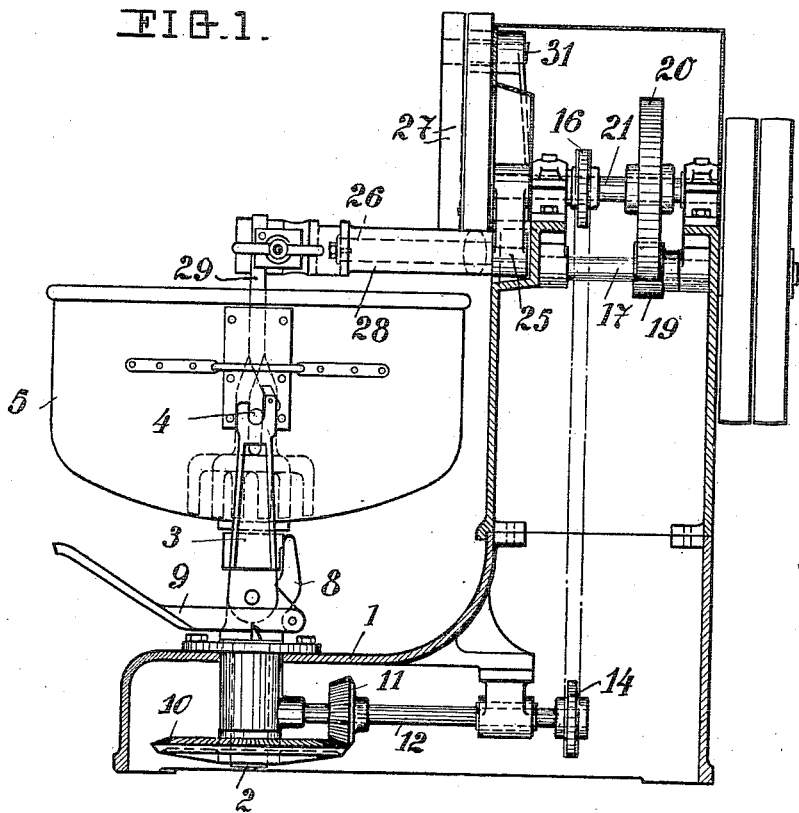
Figure 2:
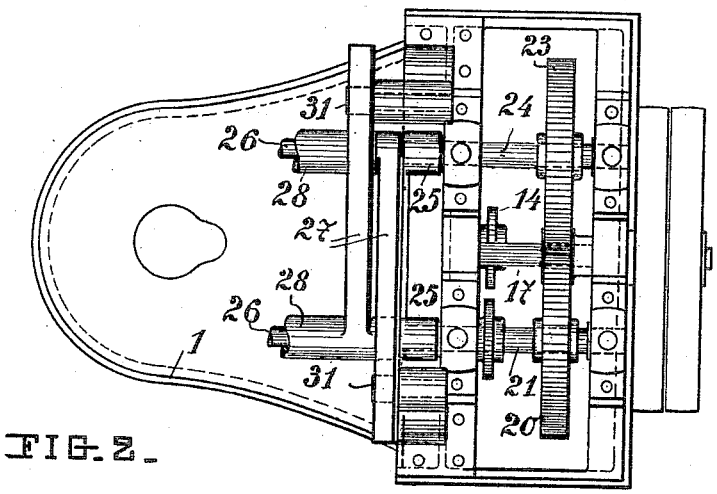
Figure 3:
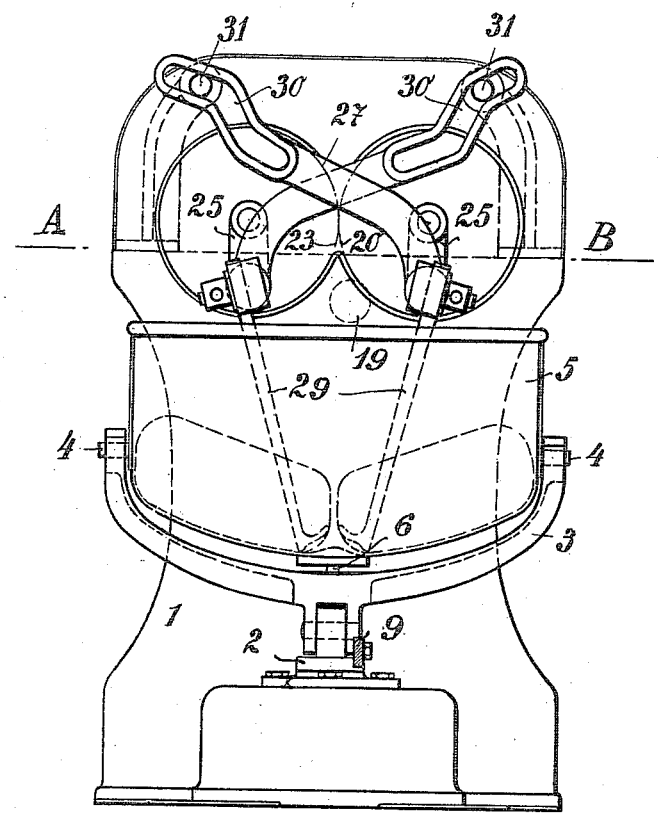

In the drawing: Figure 1 is a side elevation partly in section. Fig. 2 is a top view partly in section. Fig. 3 is a front elevation.

The substantially upright frame 1 of the machine is at its base provided with a horizontal extension. Shaft 2 rotatable and vertically mounted in said extension supports at its upper end the carrier 3 for the trough or container 5. The carrier 3 is formed by two substantially laterally and upwardly extending arms, provided at their upper ends with claws, wherein the pins 4 rest, attached sidewardly to the trough 5. A pin 6 provided on the carrier 3 is pressed by means of a spring or by other suitable means into a recess formed in a plate attached to the bottom of the trough, thus effectively locking the trough in upright position and preventing it from swinging about the pins 4. As may be seen from Fig. 3 the carrier is hinged to the upper end of shaft 2 by means of lugs and a bolt. A stop 8 in rigid connection with the shaft 2 and engaging the lugs on carrier 3 prevents the carrier and trough from tipping over in one direction, as may be seen in Fig. 1. Treadle lever 9, pivotally mounted on one of the carrier lugs and provided with an indentation engages a tooth fixed to the shaft and by swinging the lever 9 about its pivot and thus lifting it out of engagement with said tooth the carrier may be tipped over in the opposite direction. Bevel gear 11 mounted on shaft 12 and meshing with bevel gear 10 on shaft 2 serves for imparting rotary motion to the carrier and trough. Shaft 12 supported in a bearing on the frame carries a chain sprocket 14 and is driven by a chain from a sprocket 16 on shaft 21. The latter shaft receives its drive from the main shaft 17 by means of a spur-gear 20 meshing with a pinion 19 on shaft 17. Pulleys sitting on shaft 17 at the end, which extends from the machine frame transmit motion to the main shaft 17. Gear 23 of the same diameter as gear 20, is mounted on shaft 24 and meshes with said gear 20.

Suitable bearings are provided on the frame of the machine for the shafts 17, 21, and 24. The shafts 21 and 24, preferably arranged at the same height in relation to the base of the machine, are provided at their forward ends with crank arms 25, these crank arms rotating within circular recesses in the front of the frame. The crank pins 26 carry the sleeves 28, the sleeves being loosely attached to said pins. The kneaders 29 are secured to the front end of these sleeves, extending downwardly into the trough 5. The lower ends of the kneaders 29 are provided with spikes or prongs to effect a thorough mixing of the mass. By reference to Fig. 1 it may be noted that these projecting portions or spikes are arranged, so that, when the lower ends of the kneading members are in juxtaposition, the projecting portions of one kneading member register with the interspaces between the projecting portions of the other kneading member. By this means the spikes when they separate, especially in their uppermost position, are adapted to tear apart the dough, and work air into the mass. The upper ends of the kneaders are slidably adjustable and detachably mounted on the sleeves 28 and are rigidly held in position on said sleeves by means of a clamping screw. The sleeves 28 are preferably integral with guiding arms 27 extending substantially laterally and upwardly from said sleeves, crossing each other in the front of the machine. Guiding slots 30 provided in the upper end of the arms 27 and engaged by the pins 31, the latter being rigidly mounted in some suitable way in the frame of the machine, are shaped so that they impart a motion to the sleeves 28 on their pins 26. This oscillating motion of the sleeves combined with the rotary motion of the crank pins serves to impart the following movement to the kneaders. In going down the kneader prongs follow substantially the outline of the inner surface of the trough bottom approaching each other, then they rise, move in a still ascending motion increasing the distance between them and then they are lowered again, substantially as indicated in dotted lines in Fig. 3.

It will be understood that it is not desired to limit the invention exclusively to the embodiment described above. For instance the guide arms must not necessarily cross each other, the slots provided in the guide arms may be replaced by suitably shaped recesses, antifriction rollers may be substituted for the guiding pins, means may be provided to disengage the bevel gears 10 and 11, the belt pulleys may be replaced by other driving means and similar substitutions may be arranged.

I claim:

1. In a kneading machine the combination, with a container, of a carrier for said container, a rotating support for said carrier, said carrier being pivotally mounted on said support and said container being pivotally secured to said carrier.

2. In a kneading machine the combination with a container, of a carrier for said container, a rotating support for said carrier, said carrier being pivotally mounted on said support, said container being pivotally secured to said carrier, means for locking said carrier in upright position on said support and means for locking said container in upright position on said carrier.

3. In a kneading machine the combination with a container, of kneading arms projecting into said container, guiding arms connected with said kneading arms, said guiding arms being provided with curved slots, rotating crank arms engaging said kneading arms and elements mounted on the machine engaging said curved slots.

4. In a kneading machine the combination with a container, of kneading arms projecting into said container, guiding arms connected with said kneading arms, said guiding arms crossing each other and being provided with curved slots, rotating crank arms engaging said kneading arms and elements mounted on the machine engaging said curved slots.

5. In a kneading machine the combination with a container, of kneading arms projecting into said container, guiding arms connected with said kneading arms, said guiding arms being provided with curved slots and crossing each other, rotating crank arms engaging said kneading arms, and elements mounted on the machine engaging said curved slots, said elements in coaction with said guiding arms being adapted to impart successively downward, diverging, upward and approaching movements to the lower ends of said kneading members.

In testimony whereof I affix my signature in presence of two witnesses.

JAKOB LIPS.

Witnesses:
 GEORG ROTH,
 JOSEPH SIMON.